C. D. TISDALE.

Improvement in Car-Trucks.

No. 4,378. Reissued May 9, 1871.

Charles D. Tisdale
by his Attys.
Crosby, Halstead & Gould

Witnesses:
S. B. Kidder
M. W. Frothingham

AM. PHOTO-LITHOGRAPHIC CO. N.Y. (OSBORNE'S PROCESS)

United States Patent Office.

CHARLES D. TISDALE, OF BOSTON, MASSACHUSETTS, ASSIGNOR, THROUGH MESNE ASSIGNMENTS, TO CHARLES BOCKUS AND SAMUEL SHACKELL, OF SAME PLACE, AND HENRY SHACKELL, OF MONTREAL, CANADA.

Letters Patent No. 44,694, dated October 11, 1864; reissue No. 4,378, dated May 9, 1871.

IMPROVEMENT IN CAR-TRUCKS.

The Schedule referred to in these Letters Patent and making part of the same.

*To all whom it may concern:*

Be it known that I, CHARLES D. TISDALE, of Boston, in the county of Suffolk, in the State of Massachusetts, have invented an Improved Car-Truck; and I do hereby declare that the following, taken in connection with the drawing which accompanies and forms part of this specification, is a description of my invention sufficient to enable those skilled in the art to practice it.

My invention relates principally to the means employed for securing each wheel in its respective positions upon the axle of a car-truck for either a wide or a narrow-gauge track; and It consists in constructing each sliding wheel with a sleeve having one or more slots, which, by sliding the wheel, may be brought into connection with a groove upon the axle, so that the wheel may be locked in different positions by a suitable bolt passed through the slot and groove brought into connection.

Each wheel to be moved is made with a centrally-projecting hub-tube or sleeve, forming part of the wheel and encompassing the axle; and this sleeve may be made with a "feather" or spline-and-groove connection with the axle, so that the wheel can slide upon the axle, while both must rotate together or as one piece.

Through these sleeves transverse slots are made, and in each axle corresponding grooves, so that a latch, key, or bolt, passing through a slot in the sleeve into a groove in the axle, locks the wheel and axle together, or so that the wheel is incapable of end movement upon the axle, while, by sliding the wheel along (when free to slide) and bringing the same slot in the sleeve into line with another groove in the axle, or another slot in the sleeve opposite the same, or another groove in the axle, the wheel may be locked in new position upon the axle.

The drawing represents a car-axle and its wheels, embodying my improvements.

Figure 6:
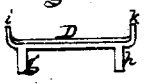

Figure 6 a side view, and

Figure 7:
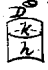

Figure 7 an end view of the double latch, to be hereinafter described.

A A denote the wheels;

B, the axle;

C, the axle-sleeve, projecting inwardly from and forming part of each wheel.

The wheel A with its sleeve C should be capable of being slid longitudinally on the axle.

One of the sleeves C and the axle may have a "feather-connection," in order to prevent the sleeve and wheel from revolving on and independently of the axle. If preferable, there may be a feather-connection to each of the sleeves and the axle. When one sleeve only has the feather-connection applied to it and the axle, the other sleeve and wheel will be free to revolve faster than the axle, in order that the revolutions of one of the two wheels may be independent of the other while the wheels may be traveling on a curved track.

Such a feather-connection consists of a tongue or rib, *a*, and a corresponding groove, *b*, the said tongue being caused to project from the axle and into the groove made in the sleeve.

In carrying out my invention I prefer to form the axle, where it is to be within each of the sleeves, with two annular grooves, *c d*, going transversely around it.

Figure 1:
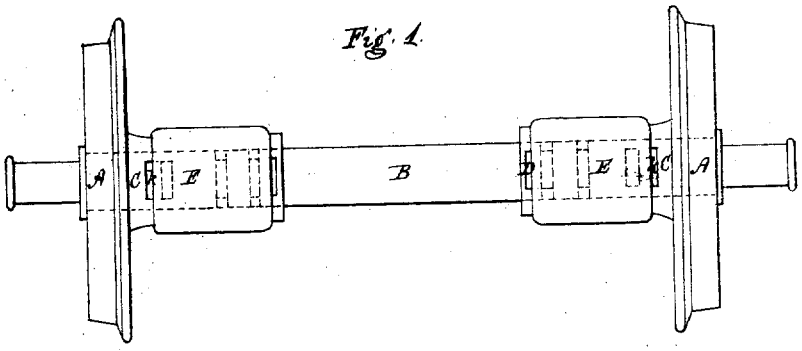
Figure 1 is a top view of an axle and two wheels provided with my invention.
Figure 2:
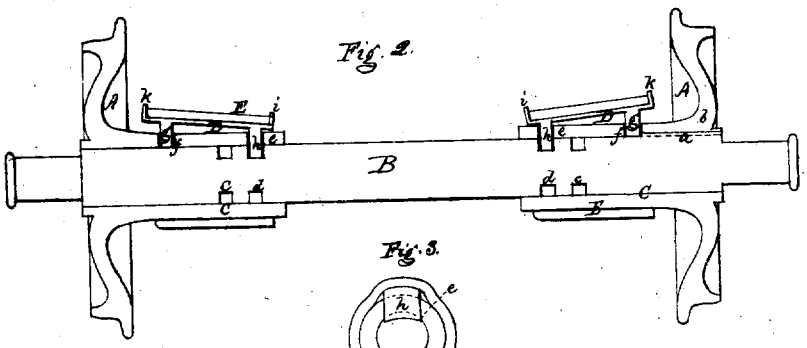
Figure 2 is a longitudinal section of the same.
Figure 3:
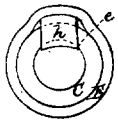
Figure 3 is a transverse section of one of the wheel-sleeves and the double latch and tubular spring thereof.
Figure 4:
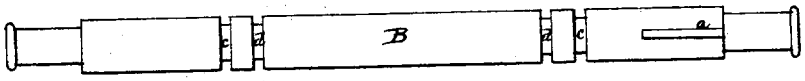
Figure 4 is a side view of the axle as it appears when divested of the wheels and their sleeves.
Figure 5:
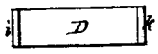
Figure 5 is a top view.

I also prefer to make the sleeve with two openings, *e f*, leading through it, and arranged as shown in fig. 2.

These openings are intended to receive the projections *g h* of a double latch, D, which consists of a bar or plate of metal provided with two studs or projections, *g h*, extending from it, as shown in the drawing.

An elastic tube or band, E, formed of vulcanized India rubber, embraces the sleeve C and the latch D, the said latch being provided with two ears, *i k*, to keep the latch in proper connection with the band. These ears are also to enable either end of the latch D to be raised or moved away from the axle by means of a pry or lever inserted between the ear and the sleeve and forced against the ear.

By so raising up the latch as to draw the projection *g* out of the groove *c*, and putting a block or wedge between the sleeve and the ear *i*, the sleeve will be free to be moved inward on the axle. By so moving it until the projection *h* may be directly over the groove *d*, the contractile spring or power of the band E will force the projection *h* down into the groove *d*, in which case the wheel will be set for running on the narrower-gauge track, and the projection *g* will rest on the outer surface of the axle. If, after this, we raise the projection *h* out of the groove *d*, and block up that end of the double latch to which such projection appertains, we shall be able to move the sleeve outward on the axle until the projection *g* may meet and be forced into the groove *c*, which having taken place the wheel will be adjusted for the wider track.

When the two tracks are united by a connecting track of two rails gradually approaching each other as they run from the wider to the narrower track, the approaching rails will serve to move the wheels from one position to the other on the axle to adapt them to either track, as seen in United States Letters Patent No. 37,889, of March 10, 1863, granted for my invention of a mode of applying cars to railroad tracks of different gauges.

Preparatory to the entrance of the wheels on the connecting track the double catch for each sleeve is to be raised and blocked up at the proper end, in which case both of the projections *g h* will be out of the grooves *d e*, and thus the wheels will be free to slide on the axle, and while moving on the connecting track the wheels will be gradually moved by it longitudinally on the axle until the advanced track is entered on. As soon as this takes place the unlocked stud of the double catch, by the contractile power of the spring E, will be forced into the groove of the axle, and thus lock the wheel in its proper position on the axle for running on the advanced track.

Only one groove, *d* or *e*, is essential to my invention, as the studs *g h* may alternately enter it; but I prefer to have two of them, as it enables the double catch to be made longer than it otherwise could be, and to operate, in some respects, to better advantage.

I claim—

1. In a car-truck having sliding wheels, a transverse slot or slots in the hub or sleeve, and a corresponding groove or grooves in the axle to permit the wheels to be slid upon the axle and retained in position for either a wide or a narrow-gauge track, by a suitable chock or bolt driven into either groove in the axle and a corresponding groove or slot in the hub or sleeve.

2. The double catch D, made with the two locking projections *g h*, working in connection with one or two grooves in the axle, substantially as shown and described.

3. A contractile band or encompassing-spring, E, for retaining the locking device in position, substantially as described.

C. D. TISDALE.

Witnesses:
HENRY A. MAY,
HERBERT MERRITT.